(12) United States Patent
Wei et al.

(10) Patent No.: US 12,164,140 B2
(45) Date of Patent: Dec. 10, 2024

(54) WAVEGUIDE STRUCTURE AND OUTCOUPLING ELEMENTS

(71) Applicant: Meta Platforms Technologies, LLC, Menlo Park, CA (US)

(72) Inventors: Guohua Wei, Redmond, WA (US); Qi Zhang, Kirkland, WA (US); Andrew John Ouderkirk, Kirkland, WA (US); Matthew E Colburn, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/077,567

(22) Filed: Dec. 8, 2022

(65) Prior Publication Data

US 2023/0119729 A1 Apr. 20, 2023

Related U.S. Application Data

(63) Continuation of application No. 16/877,988, filed on May 19, 2020, now Pat. No. 11,561,336.

(60) Provisional application No. 62/911,214, filed on Oct. 5, 2019.

(51) Int. Cl.
*F21V 8/00* (2006.01)
*G02B 27/01* (2006.01)

(52) U.S. Cl.
CPC ....... *G02B 6/0055* (2013.01); *G02B 27/0172* (2013.01); *G02B 2027/0178* (2013.01)

(58) Field of Classification Search
CPC .............. G02B 6/0055; G02B 27/0172; G02B 2027/0178; G02B 27/4272; G02B 2027/0138; G02B 2027/014; G02B 27/0093; G02B 6/0001; G02B 6/34; G06F 3/013
See application file for complete search history.

(56) References Cited

U.S. PATENT DOCUMENTS

| | | | |
|---|---|---|---|
| 8,666,208 B1 * | 3/2014 | Amirparviz | G02B 6/10 385/47 |
| 10,527,854 B1 | 1/2020 | Trail | |
| 2015/0182748 A1 | 7/2015 | Gefen et al. | |
| 2017/0038834 A1 | 2/2017 | Wilson et al. | |
| 2017/0207600 A1 * | 7/2017 | Klamkin | H01S 5/142 |
| 2018/0074457 A1 | 3/2018 | Jolly et al. | |

(Continued)

FOREIGN PATENT DOCUMENTS

| | | |
|---|---|---|
| CN | 107783297 A | 3/2018 |
| JP | 2014224896 A | 12/2014 |

(Continued)

OTHER PUBLICATIONS

Blahut M., "Multimode Interference Structures-Properties and Applications," Optica Applicata, 2004, vol. XXXIV (4), 15 Pages.

(Continued)

*Primary Examiner* — Collin X Beatty
(74) *Attorney, Agent, or Firm* — Freestone Intellectual Property Law PLLC; Aaron J. Visbeek

(57) ABSTRACT

Outcoupling elements are disposed with a transparent layer. A transparent waveguide structure receives non-visible light and delivers the non-visible light to the outcoupling elements. The outcoupling elements outcouple the non-visible light as non-visible illumination light.

19 Claims, 9 Drawing Sheets

(56) References Cited

U.S. PATENT DOCUMENTS

| | | | |
|---|---|---|---|
| 2018/0196263 A1* | 7/2018 | Vallius | G02B 27/0172 |
| 2018/0332275 A1 | 11/2018 | Gruhlke et al. | |
| 2019/0162908 A1* | 5/2019 | Moebius | G02B 6/124 |
| 2019/0227319 A1* | 7/2019 | Trail | G09G 3/002 |
| 2021/0119410 A1* | 4/2021 | Spector | H01S 5/06236 |

FOREIGN PATENT DOCUMENTS

| | | |
|---|---|---|
| WO | 2016157486 A1 | 10/2016 |
| WO | 2019122521 A1 | 6/2019 |

OTHER PUBLICATIONS

Dai D., et al., "Passive Technologies for Future Large-Scale Photonic Integrated Circuits on Silicon: Polarization Handling, Light Non-Reciprocity and Loss Reduction," Light: Science & Applications, Mar. 29, 2012, vol. 1, 12 Pages.

International Preliminary Report on Patentability for International Application No. PCT/US2020/049606, mailed Apr. 14, 2022, 9 pages.

International Search Report and Written Opinion for International Application No. PCT/US2020/049606, mailed Nov. 3, 2020, 10 Pages.

Kasap S.O., "Optoelectronics and Photonics: Principles and Practices," Prentice Hall, 2001, 178 pages.

Komljenovic T., et al., "Heterogeneous Silicon Photonic Integrated Circuits," Journal of Lightwave Technology, Jan. 1, 2016, vol. 34 (1), 16 Pages.

Komljenovic T., et al., "Photonic Integrated Circuits using Heterogeneous Integration on Silicon," Proceedings of the IEEE, Dec. 2018, 12 Pages.

Kopp C., "Silicon Photonic Circuits: On-CMOS Integration, Fiber Optical Coupling, and Packaging," IEEE Journal of Selected Topics in Quantum Electronics, 2011, vol. 17, 12 Pages.

Lin Z., et al., "Broadband, Low-Loss Silicon Photonic Y-Junction with an Arbitrary Power Spitting Ratio," Optics Express, May 13, 2019, vol. 27 (10), 6 Pages.

Mekis A., et al., "A Grating-Coupler-Enabled CMOS Photonics Platform," IEEE Journal of Selected Topics in Quantum Electronics, May/Jun. 2011, vol. 17 (3), 12 Pages.

Non-Final Office Action mailed May 25, 2022 for U.S. Appl. No. 16/877,988, filed May 19, 2020, 14 pages.

Notice of Allowance mailed Sep. 9, 2022 for U.S. Appl. No. 16/877,988, filed May 19, 2020, 8 pages.

Synder B., et al., "Hybrid Integration of the Wavelength-Tunable Laser with a Silicon Photonic Integrated Circuit," Journal of Lightwave Technology, Dec. 15, 2013, vol. 31 (24), 9 Pages.

Yeniay A., et al., "Ultra-Low-Loss Polymer Waveguides," Journal of Lightwave Technology, Jan. 2004, vol. 22 (1), 5 Pages.

Office Action mailed Mar. 29, 2024 for Chinese Application No. 202080053736.9, filed Sep. 6, 2020, 8 pages.

Office Action mailed Aug. 28, 2024 for Chinese Application No. 202080053736.9, filed Sep. 6, 2020, 5 pages.

Office Action mailed Jul. 30, 2024 for Japanese Patent Application No. 2022-500531, filed on Sep. 6, 2020, 8 pages.

\* cited by examiner

WAVEGUIDE STRUCTURE AND OUTCOUPLING ELEMENTS

CROSS-REFERENCE TO RELATED APPLICATIONS

This application is a continuation of U.S. application Ser. No. 16/877,988, filed May 19, 2020, which claims the benefit of U.S. Provisional Application No. 62/911,214 filed Oct. 5, 2019. U.S. application Ser. No. 16/877,988 and U.S. Provisional Application No. 62/911,214 are expressly incorporated herein by reference in their entirety.

BACKGROUND INFORMATION

A common technique to illuminate a target is to aim one or more light sources such as light emitting diodes (LEDs) toward the target. Yet, conventional light sources have a large enough footprint to introduce significant occlusions into an optical system. In the particular context of head mounted devices, it may be desirable to illuminate an eye region without introducing significant occlusions into an optical system.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
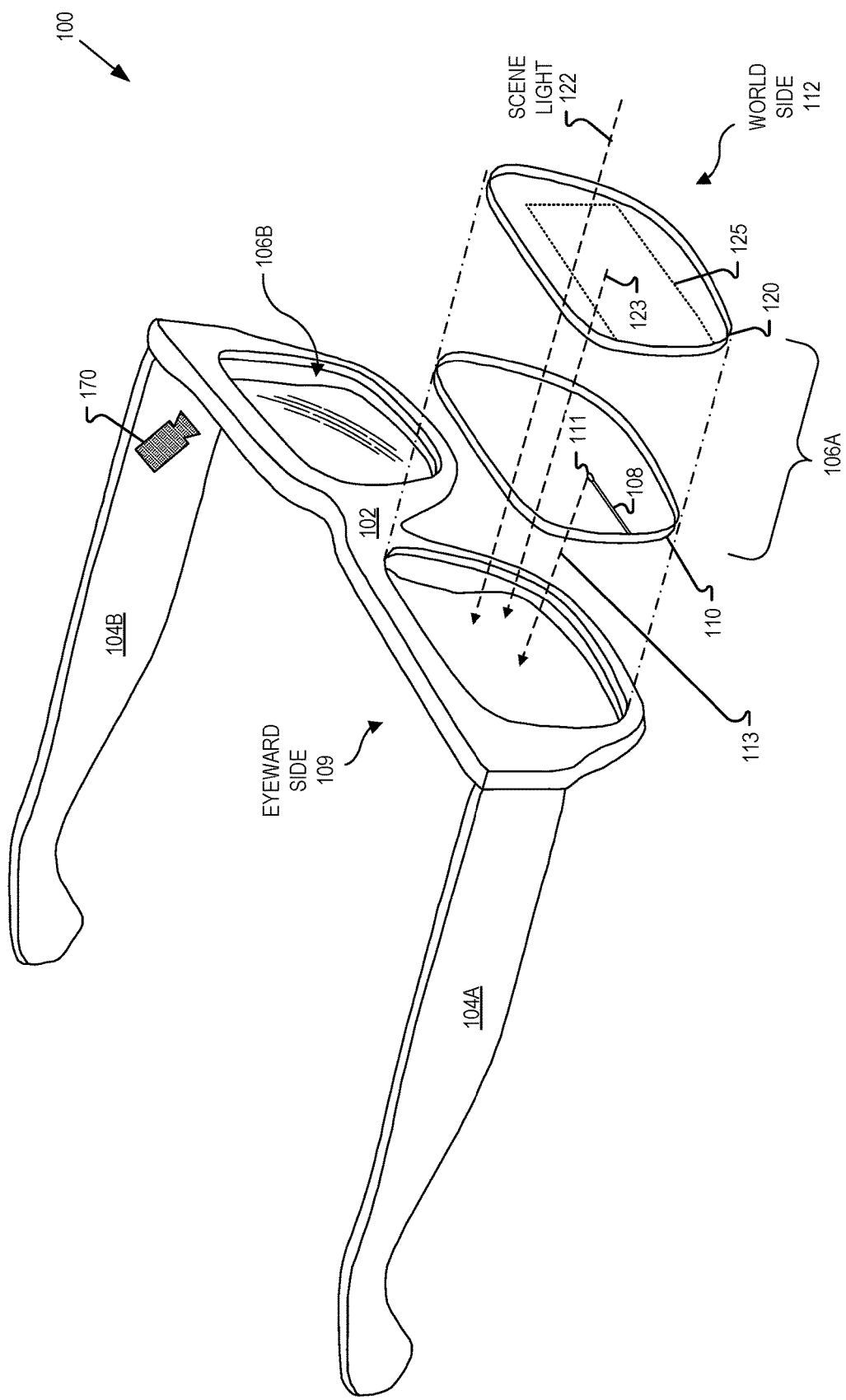
FIG. 1 illustrates an example head mounted device, in accordance with aspects of the present disclosure.

Embodiments of a waveguide structure with outcoupling elements are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 800 nm-1.6 µm.

Creating an illumination optical system across a transparent layer typically includes disposing light sources across the transparent layer and routing electrical conductors to the light sources. However, even when the light sources are small, they introduce occlusions into the optical system and the electrical traces that are routed to power the light sources may cause unwanted diffraction effects. In the context of a head mounted device such as smart glasses, an augmented reality (AR) head mounted display (HMD), or a virtual reality (VR) HMD, it may be advantageous to illuminate an eye region from a transparent layer in the field of view (FOV) of a user of the head mounted device. In some contexts, the eye region is illuminated with non-visible illumination light (e.g. near-infrared light) to image the eye for eye-tracking purposes, for example.

In aspects of the disclosure, a transparent layer shaped like a lens may be mounted to a frame of a head mounted device. A transparent waveguide structure receives non-visible light from one or more light sources such as an LED, a superluminescent light emitting diode (S-LED), or a vertical-cavity surface-emitting laser (VCSEL). The transparent waveguide structure delivers the non-visible light to outcoupling elements disposed across the transparent layer. The outcoupling elements direct the received non-visible light toward an eye region as non-visible illumination light. A camera configured to image the non-visible light may then capture eye-tracking images of the eye illuminated with non-visible illumination light. These and other embodiments are described in more detail in connection with FIGS. 1-5.

FIG. 1 illustrates an example head mounted device 100, in accordance with aspects of the present disclosure. A head mounted device, such as head mounted device 100, is one type of smart device. In some contexts, head mounted device 100 is also a head mounted display (HMD) Artificial reality is a form of reality that has been adjusted in some manner before presentation to the user, which may include, e.g., virtual reality (VR), augmented reality (AR), mixed reality (MR), hybrid reality, or some combination and/or derivative thereof.

The illustrated example of head mounted device 100 is shown as including a frame 102, temple arms 104A and 104B, and a near-eye optical element 106A and a near-eye optical element 106B. FIG. 1 also illustrates an exploded view of an example of near-eye optical element 106A. Near-eye optical element 106A is shown as including an illumination layer 110 and a display layer 120.

As shown in FIG. 1, frame 102 is coupled to temple arms 104A and 104B for securing the head mounted device 100 to the head of a user. Example head mounted device 100 may also include supporting hardware incorporated into the frame 102 and/or temple arms 104A and 104B. The hardware of head mounted device 100 may include any of processing logic, wired and/or wireless data interfaces for sending and receiving data, graphic processors, and one or more memories for storing data and computer-executable instructions. In one example, head mounted device 100 may be configured to receive wired power and/or may be configured to be powered by one or more batteries. In addition, head mounted device 100 may be configured to receive wired and/or wireless data including video data.

FIG. 1 illustrates near-eye optical elements 106A and 106B that are configured to be mounted to the frame 102. The frame 102 may house the near-eye optical elements 106A and 106B by surrounding at least a portion of a periphery of the near-eye optical elements 106A and 106B. The near-eye optical element 106A is configured to receive visible scene light 122 at a world side 112 of the near-eye optical element 106A. The visible scene light 122 propagates through optical element 106A to an eye of a user of the head mounted device on an eyeward side 109 of optical element 106A. In some examples, near-eye optical element 106A may be transparent or semi-transparent to the user to facilitate augmented reality or mixed reality such that the user can view visible scene light 122 from the environment while also receiving display light 123 directed to their eye(s) by way of display layer 120. A waveguide 125 included in display layer 120 may be utilized to direct the display light 123 generated by an electronic display in an eyeward direction, although other display technologies may also be utilized in display layer 120. In some implementations, at least a portion of an electronic display is included in the frame 102 of the head mounted device 100. The electronic display may include an LCD, an organic light emitting diode (OLED) display, micro-LED display, pico-projector, or liquid crystal on silicon (LCOS) display for generating the display light 123.

In further examples, some or all of the near-eye optical elements 106A and 106B may be incorporated into a virtual reality headset where the transparent nature of the near-eye optical elements 106A and 106B allows the user to view an electronic display (e.g., a liquid crystal display (LCD), an organic light emitting diode (OLED) display, a micro-LED display, etc.) incorporated in the virtual reality headset. In this context, display layer 120 may be replaced by the electronic display.

Illumination layer 110 includes a transparent layer that may be formed of optical polymers, glasses, transparent wafers (such as high-purity semi-insulating SiC wafers) or any other transparent materials used for this purpose. A waveguide structure 108 is configured to receive non-visible light from a non-visible light source coupled with frame 102. Waveguide structure 108 is configured to deliver the non-visible light from the non-visible light source to outcoupling element 111, in FIG. 1. Only one waveguide structure 108 and one outcoupling element 111 are illustrated in FIG. 1, although there may be a plurality of outcoupling elements in some implementations. The one or more outcoupling elements 111 are configured to outcouple the non-visible light propagating in waveguide structure 108 as non-visible illumination light 113 to illuminate an eye region.

The non-visible illumination light 113 may be near-infrared light, in some aspects. The non-visible light source that generates the non-visible light for waveguide structure 108 may include one or more of light emitting diode (LED), a micro light emitting diode (micro-LED), an edge emitting LED, a vertical cavity surface emitting laser (VCSEL), on-chip integrated laser, hybrid integrated laser, or a Superluminescent diode (S-LED). Depending on the architecture, a single light source or a light source array can be used. When a single light source is used, waveguide splitters can be used to distribute the light into multiple outputs. The light source may be buried in the frame so that is out of a FOV (field of view) of a user. When an array of light sources is used, each light source can supply one output so that no waveguide splitter is needed. A waveguide splitter may be used to split the power in one waveguide into multiple waveguides. For example, a Y shaped splitter can divide a single waveguide into two channels with balanced power or designed unbalanced power. A 1×2 MMI (multimode interferometer) coupler can function similarly to a Y splitter, a 1×4 MMI splitter can divide a single waveguide into 4 channels, and so on. A Mach-Zehnder interferometer can also be used for splitting optical power of a waveguide.

In some implementations, a combiner layer (not illustrated) is optionally disposed between display layer 120 and illumination layer 110 to direct reflected non-visible illumination light that has reflected from an eye region to a camera (e.g. camera 170) to capture eye-tracking images. In some implementations, camera 170 is positioned to image the eye directly by imaging the reflected non-visible illumination light reflecting from the eye region. Camera 170 may include a complementary metal-oxide semiconductor (CMOS) image sensor. When non-visible illumination light 113 is infrared light, an infrared filter that receives a narrow-band infrared wavelength may be placed over the image sensor so it is sensitive to the narrow-band infrared wavelength while rejecting wavelengths outside the narrow-band, including visible light wavelengths.

As shown in FIG. 1, outcoupling element 111 and waveguide structure 108 are disposed within the field-of-view (FOV) of a user provided by the near-eye optical element 106A. While outcoupling element 111 may introduce minor occlusions or non-uniformities into the near-eye optical element 106A, outcoupling element(s) 111 and waveguide structure 108 may be so small as to be unnoticeable or insignificant to a wearer of head mounted device 100. Additionally, any occlusion from outcoupling element 111 and waveguide structure 108 may be placed so close to the eye as to be unfocusable by the human eye and therefore outcoupling element 111 and waveguide structure 108 will not be noticeable to a user of device 100. Waveguide structure 108 includes a transparent (to visible light) dielectric material, in some implementations. Furthermore, outcoupling element 111 and waveguide structure 108 may be so small that even an observer (a person not wearing device 100 but viewing device 100) may not notice outcoupling element 111 and waveguide structure 108. Outcoupling element 111 may be smaller than 75 microns at its widest/longest dimension. In an implementation, outcoupling element 111 may be smaller than 20 microns at its widest/longest dimension and waveguide structure 108 may be approximately 1-10 microns wide and formed with transparent materials. Waveguide structure 108 may be approximately 100 nm to 1 micron, in some implementations. Outcoupling element 111 may be approximately 10 microns at its widest/longest dimension, in some implementations. In contrast, actual light sources positioned in illumination layer 110 would have a footprint of approximately 100×100 microns or larger.

In some implementations, optical element 106A may have a curvature for focusing light (e.g., display light 123) to the eye of the user. The curvature may be included in the transparent layer of illumination layer 110. Thus, optical element 106A may be referred to as a lens. In some aspects, optical element 106A may have a thickness and/or curvature that corresponds to the specifications of a user. In other words, optical element 106A may be considered a prescription lens.

Figure 2:
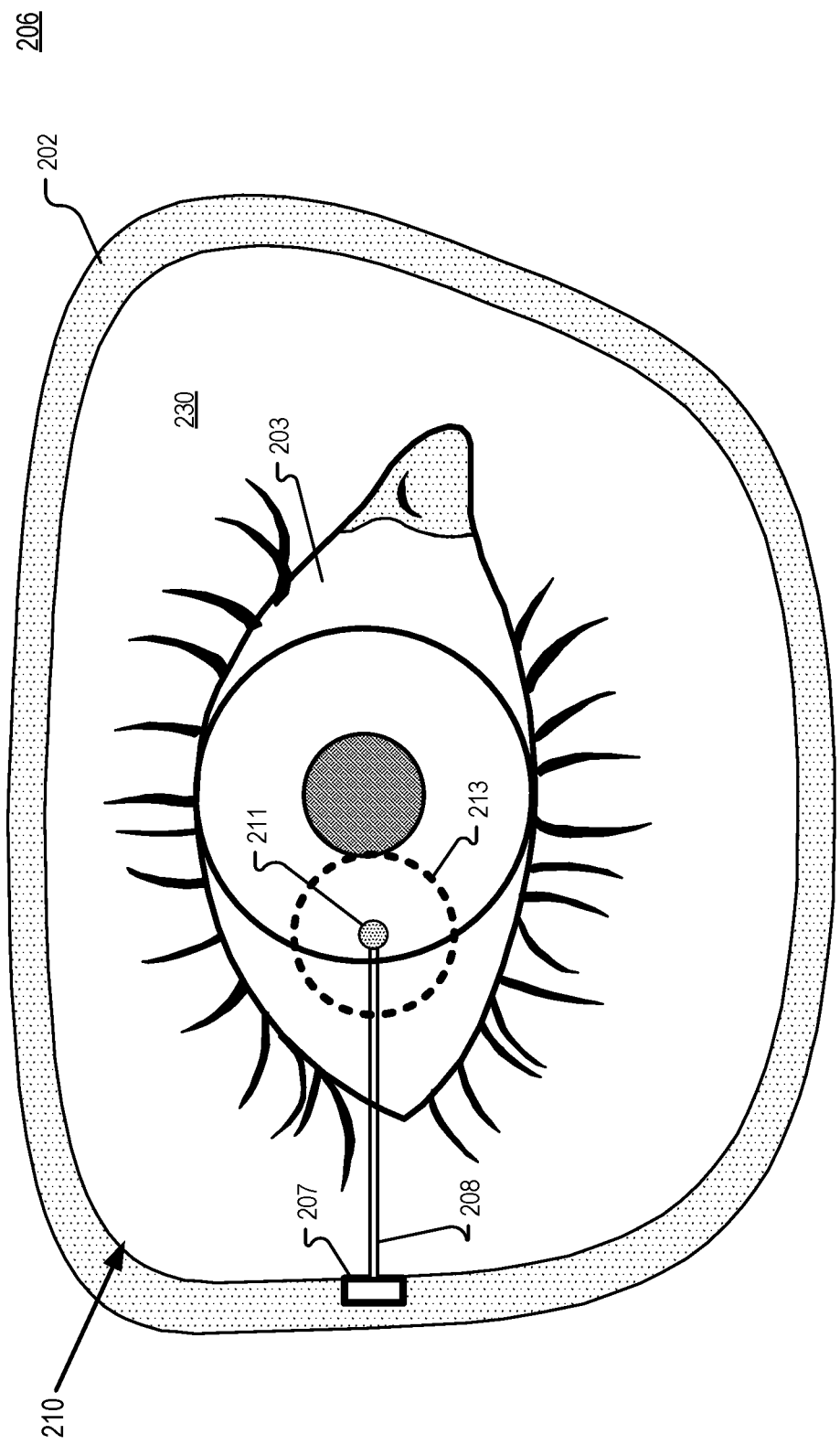
FIG. 2 illustrates an example optical element including an illumination layer having a transparent layer, a waveguide structure, and an outcoupling element, in accordance with an embodiment of the disclosure.

FIG. 2 illustrates an example optical element 206 including illumination layer 210 having a transparent layer 230, a waveguide structure 208, and an outcoupling element 211, in accordance with aspects of the disclosure. Transparent layer 230 may be made from glass or optical polymer. Non-visible light source 207 emits non-visible light into waveguide structure 208 and waveguide structure 208 is configured to receive non-visible light from non-visible light source 207 coupled with frame 202. Non-visible light source 207 may include a laser source, a superluminescent light emitting diode (S-LED), or a vertical-cavity surface-emitting laser (VCSEL), for example.

Waveguide structure 208 confines the non-visible light emitted by non-visible light source 207 and the non-visible light propagates toward outcoupling element 211. As in FIG. 1, only one waveguide structure 208 and one outcoupling element 211 are illustrated in FIG. 2, although there may be a plurality of outcoupling elements in some implementations. The one or more outcoupling elements 211 are configured to outcouple the non-visible light propagating in waveguide structure 208 as non-visible illumination light 213 to illuminate an eye 203 in the eye region. Outcoupling element 211 may be configured to generate cone-shaped non-visible illumination light 213. The outcoupling element(s) 211 may be configured differently to output non-visible illumination light 213 in different divergence angles and/or different shapes to form patterned non-visible illumination light. The patterned non-visible illumination light may assist in processing and analyzing eye-tracking images that include reflected non-visible illumination light 213 that is captured by a camera, for example.

Figure 3A:
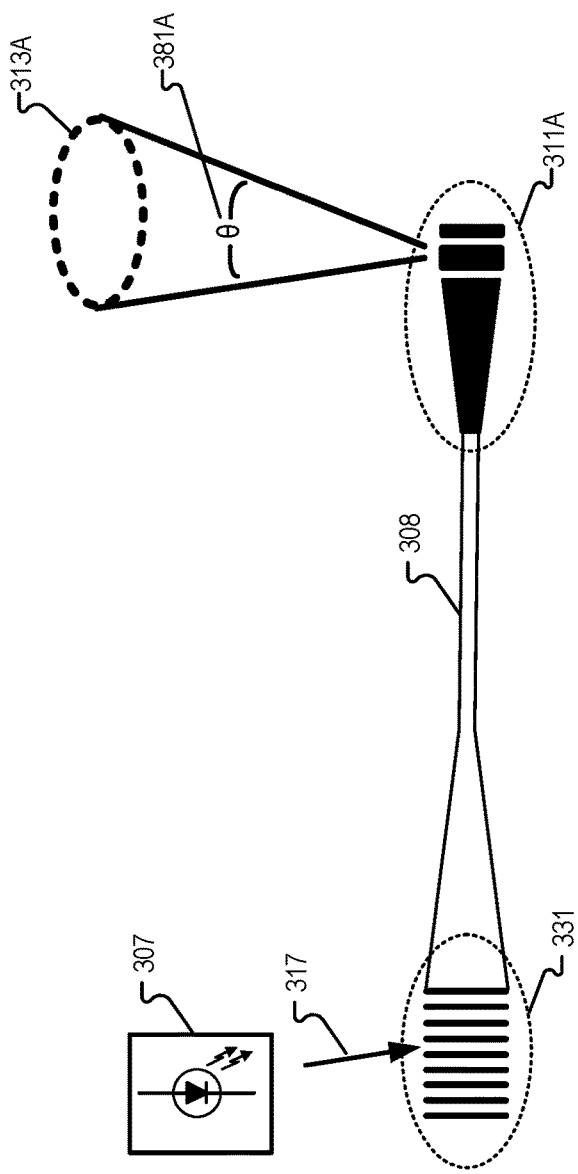
FIG. 3A illustrates a functional diagram of an input coupler, a waveguide structure, and an outcoupling element, in accordance with aspects of the present disclosure.

FIG. 3A illustrates a functional diagram of an input coupler 331, waveguide structure 308, and outcoupling element 311A, in accordance with aspects of the disclosure. Taken together, the components of FIG. 3A may be referred to as a photonic integrated circuit (PIC). Input coupler 331 may be a grating or other conversion structure such as a prism, tapered waveguide, or otherwise. Input coupler 331 can include a single component or multiple components, for example, a grating coupler may be formed by a single grating layer or a dual grating layer. A grating may be curved for a compact input coupler. Input coupler 331 may include a coupler that has a tapered waveguide for coupling to fiber, a surface grating with a back reflector, a grating with micro optics coupled to an edge emitting laser diode, or a flat waveguide end-face coupled to a lensed fiber. Input coupler 331 is configured to receive non-visible light 317 from non-visible light source 307 and incouple the non-visible light 317 into waveguide structure 308. FIG. 3B illustrates a side view of an example input coupler 331. Input coupler 331 may be specifically designed to incouple a narrow-band wavelength of non-visible light 317 into waveguide structure 308. Input coupler 331 may have a footprint that is approximately the size of the non-visible light source 307. For example, for a fiber coupled source, this is the size of the mode profile of a single mode fiber (e.g. approximately 10 microns).

Outcoupling element 311A is configured to generate a particular illumination pattern of the non-visible illumination light in the far field (approximately where the non-visible illumination light will become incident on an eye region). In the illustrated embodiment of FIG. 3A, outcoupling element 311A is configured to direct non-visible illumination light 313A in an eyeward direction in a cone-shape having a divergence angle of θ 381A. Other outcoupling elements 311 may have different divergence angles and/or different shapes. The size of outcoupling element 111/211/311 may be approximately 10 microns, which is invisible to an unaided human eye. In some aspects, outcoupling element 311A includes a main output grating. A refractive or diffractive optical element may also be used to provide beam shaping to the non-visible illumination light outcoupled by the main output grating. The outcoupling element 311A may utilize both sides of transparent layer 230 to distribute its components.

Figure 3D:
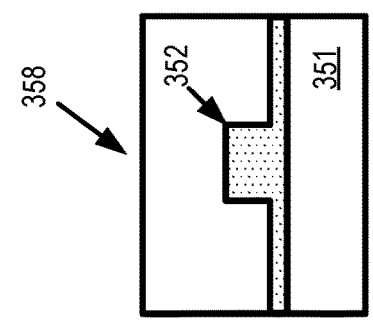
FIG. 3D illustrates a rib waveguide structure, in accordance with aspects of the present disclosure.
Figure 3C:
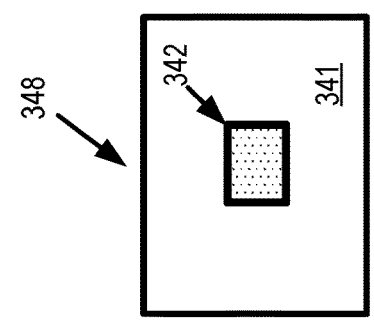
FIG. 3C illustrates a ridge waveguide structure, in accordance with aspects of the present disclosure.
Figure 3B:
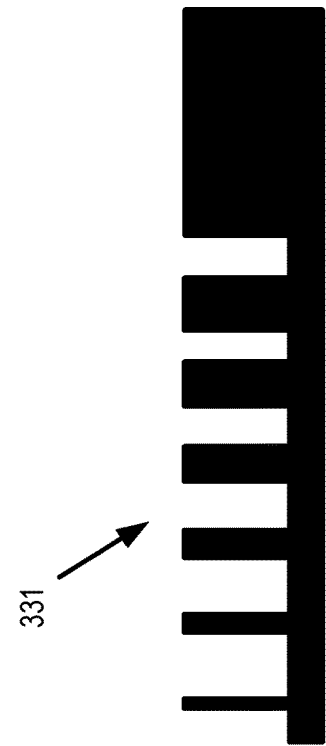
FIG. 3B illustrates a side view of an example input coupler, in accordance with aspects of the present disclosure.

FIGS. 3C and 3D illustrate example waveguide designs that may be utilized in waveguide structure 308, in accordance with aspects of the disclosure. FIG. 3C illustrates a ridge waveguide structure 348 having a first refractive material 341 surrounding a second refractive material 342. First refractive material 341 has a refractive index $n_1$ that is less than a second refractive index $n_2$ of second refractive material 342. The illustrated cross section of second refractive material 342 may be approximately 500 nm by 500 nm and the illustrated cross section of first refractive material 341 may be approximately 1.5 microns by 2 microns. FIG. 3D illustrates a rib waveguide structure 358 having a first refractive material 351 surrounding a second refractive material 352. First refractive material 351 has a refractive index $n_1$ that is less than a second refractive index $n_2$ of second refractive material 352.

Figure 3E:
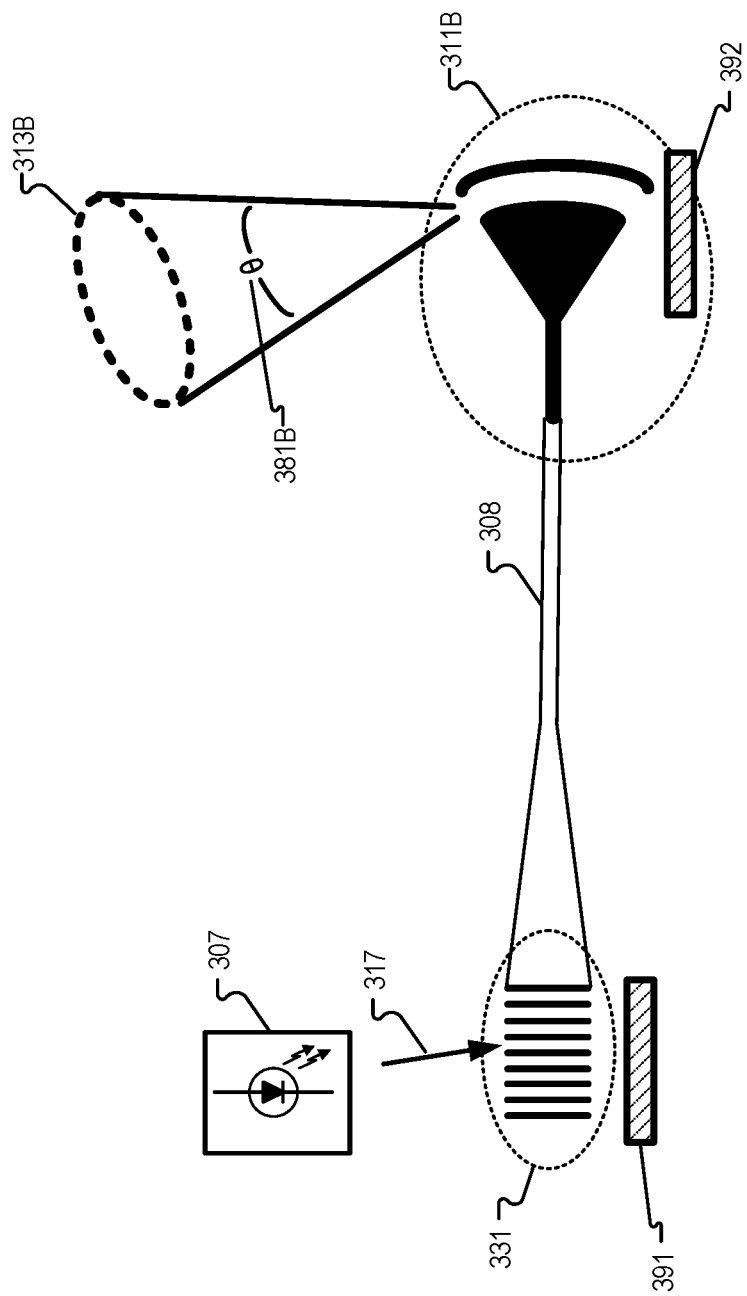
FIG. 3E illustrates an example outcoupling element generating non-visible illumination light in an eyeward direction, in accordance with aspects of the present disclosure.

FIG. 3E illustrates an example outcoupling element 311B generating non-visible illumination light 313B in an eyeward direction, in accordance with aspects of the disclosure. Outcoupling element 311B is configured to direct non-visible illumination light 313B in a different direction and at a different divergence angle θ 381B than outcoupling element 311A. FIG. 3E also illustrates that a backside reflector layer 391 may be used to increase optical efficiency by reflecting any non-visible light 317 that is not incoupled into waveguide structure 308 on the first encounter back to input coupler 331 to be incoupled into waveguide structure 308. Additionally, backside reflector layer 392 is disposed below outcoupling element 311B to reflect any stray non-visible illumination light back to outcoupling element 311B. Backside reflector layer 391 or 392 may be a metallic layer of a Distributed Bragg Reflector (DBR), for example. Backside reflector layer 391 or 392 may be disposed on a world side of the transparent layer 230. Backside reflectors 391 and 392 may also be utilized in the PIC of FIG. 3A.

Figure 3G:
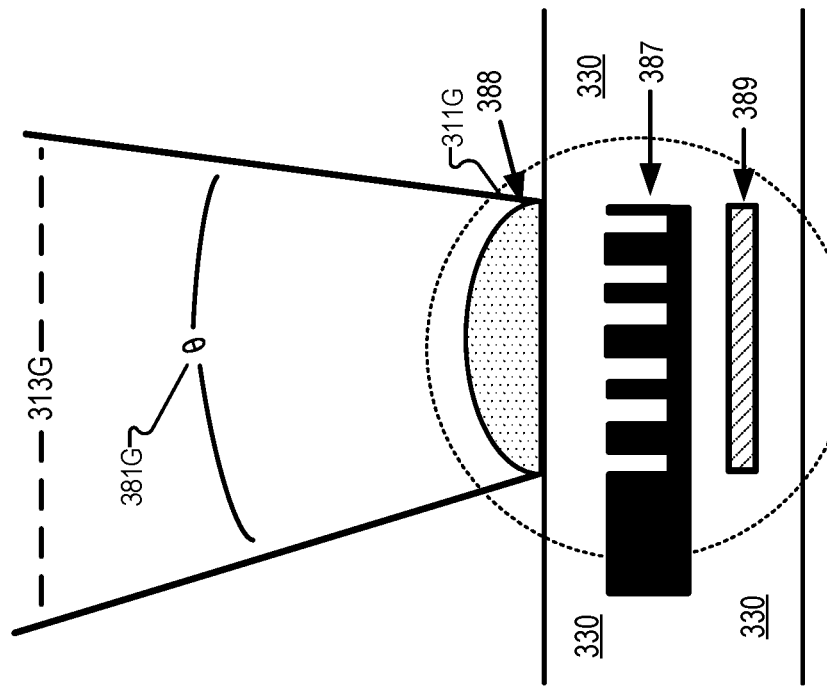
FIGS. 3F-3G illustrate example outcoupling elements having a grating, a reflector, and a beam shaping element, in accordance with aspects of the disclosure.
Figure 3F:
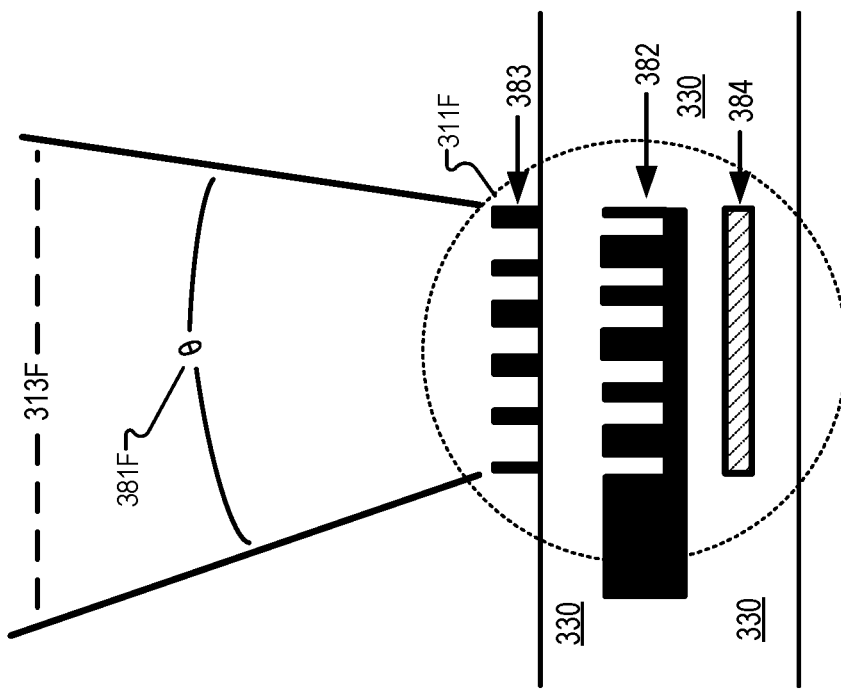

FIGS. 3F-3G illustrate example outcoupling elements having a grating, a reflector, and a beam shaping element, in accordance with aspects of the disclosure. Outcoupling elements may have a single component or multiple components. The outcoupling element may have a single grating coupler, a grating coupler paired with a back reflector, a grating coupler that has curved gratings, a grating coupler that has a dual grating layer, or a grating coupler with a back reflector and a third layer for beam shaping. The beam shaping layer may include a diffractive optical element (DOE) or a refractive microlens.

FIG. 3F illustrates an outcoupling element 311F including a grating 382, a reflector 384, and a diffractive optical element (DOE) 383 as the beam shaping layer. Grating 382 is configured to receive the non-visible light from waveguide 308 and illuminate DOE 383. Reflector 384 may recycle any stray light back toward DOE 383. Grating 382 and reflector 384 are illustrated as being included in transparent layer 330. DOE 383 may be configured with particular beam shaping features to control the divergence angle of θ 381F and the direction of non-visible illumination light 313F. The beam-shaping layer may include a metasurface formed by nanostructures or a holographic surface, for example. The DOE may be designed for specific far field illumination.

FIG. 3G illustrates an outcoupling element 311G including a grating 387, a reflector 389, and a microlens 388 as the beam shaping layer. Grating 387 is configured to receive the non-visible light from waveguide 308 and illuminate microlens 388. Reflector 389 may recycle any stray light back toward microlens 388. Grating 387 and reflector 389 are illustrated as being included in transparent layer 330. Microlens 388 may be configured with particular beam shaping features to control the divergence angle of θ 381G and the direction of non-visible illumination light 313G. The beam-shaping layer may include a microlens with a free-form surface. Microlens 388 may be designed for specific far field illumination. Microlens 388 may include a dielectric material.

A distance between the beam shaping layer and the (383 in FIG. 3F or 388 in FIG. 3G) may be greater than one micron. The beam shaping layer may be fabricated with lithography and etch processes or by nanoimprint process, for example.

Figure 3I:
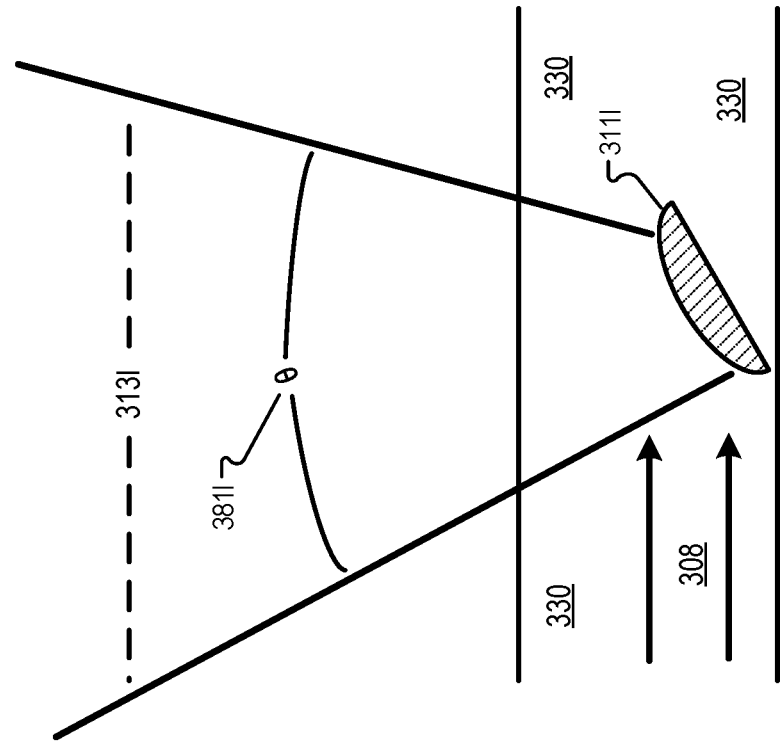
FIGS. 3H-3J illustrate example outcoupling elements having a mirror, in accordance with aspects of the disclosure.
Figure 3H:
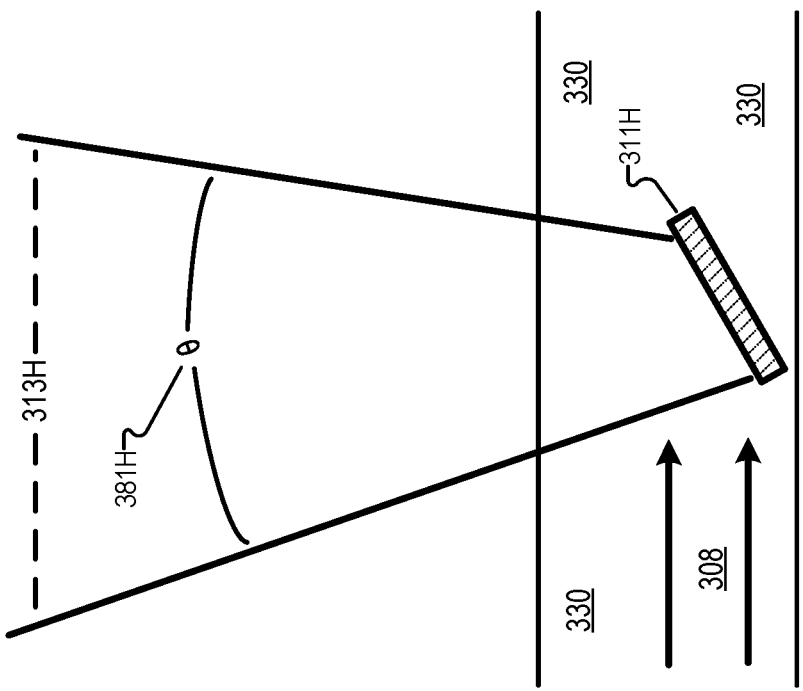

FIG. 3H illustrates an outcoupling element 311H. Outcoupling element 311H is a mirror configured to outcouple the non-visible light from waveguide 308 as non-visible illumination light 313H having divergence angle of θ 381H.

FIG. 3I illustrates an outcoupling element 311I. Outcoupling element 311I is a curved mirror configured to outcouple the non-visible light from waveguide 308 as non-visible illumination light 313I having divergence angle of θ 381I. Divergence angle θ 381I may be larger than the divergence angle of θ 381H due to the curvature of the curved mirror of outcoupling element 311I compared to a planar mirror of outcoupling element 311H.

Figure 3J:
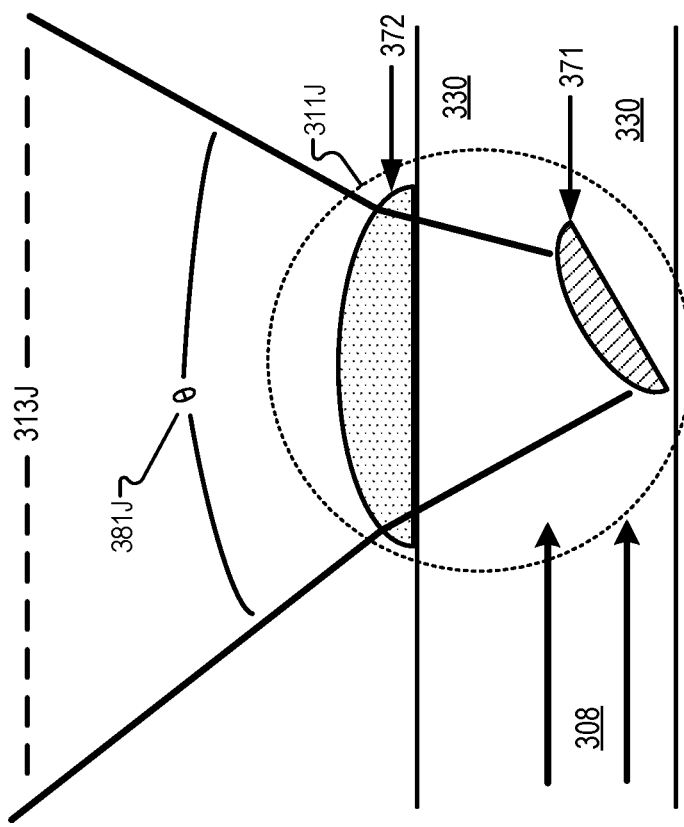

FIG. 3J illustrates an outcoupling element 311J including a curved mirror 371 and a refractive microlens 372. Outcoupling element 311J is configured to outcouple the non-visible light from waveguide 308 as non-visible illumination light 313J having divergence angle of θ 381J. Refractive microlens 372 may function as the beam-shaping layer to control the divergence of θ 381J and direction of non-visible illumination light 313J.

Figure 4:
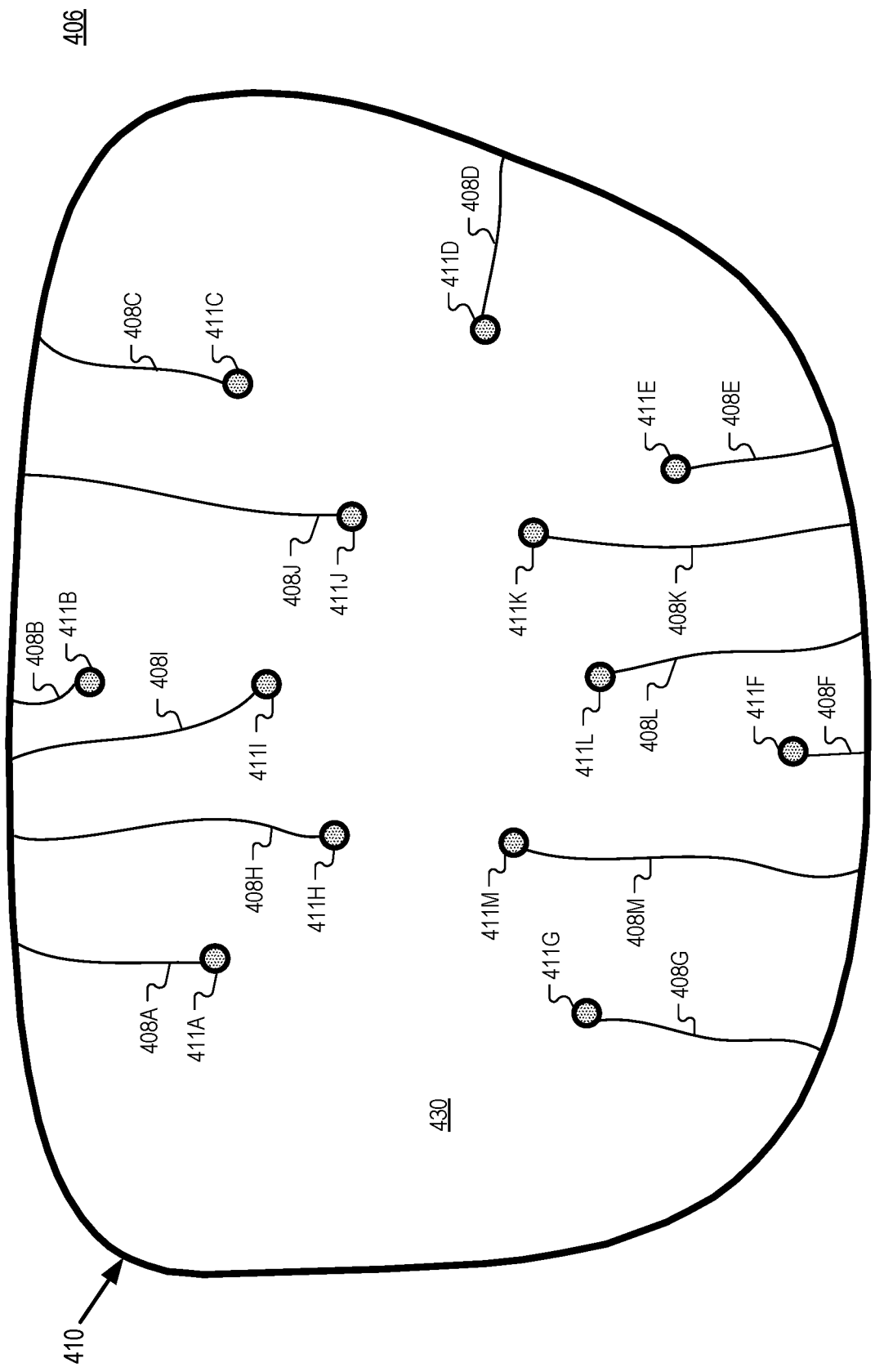
FIG. 4 illustrates an example optical element including an illumination layer having a plurality of outcoupling elements distributed across a transparent layer, in accordance with aspects of the disclosure.

FIG. 4 illustrates an example optical element 406 including an illumination layer 410 having a plurality of outcoupling elements 411 distributed across transparent layer 430, in accordance with aspects of the disclosure. FIG. 4 includes twelve outcoupling elements 411A-411M having corresponding waveguide structures 408A-408M. Each waveguide structure 408 is configured to receive non-visible light from a non-visible light source and provide the non-visible light to its respective outcoupling element 411. Each outcoupling element 411 is configured to outcouple the received non-visible light as non-visible illumination light to illuminate an eye region. Outcoupling elements 411A-411G are approximately positioned on an outside ring and outcoupling elements 411H-411M are approximately positioned on an inside ring. Of course, other arrangements and numbers of outcoupling elements 411 are possible in other implementations.

FIG. 4 illustrates an example one-to-one relationship between non-visible light sources, waveguide structures 408, and outcoupling elements 411. That is, a non-visible light source illuminates a single waveguide structure 408 to provide light to a corresponding outcoupling element.

Figure 5:
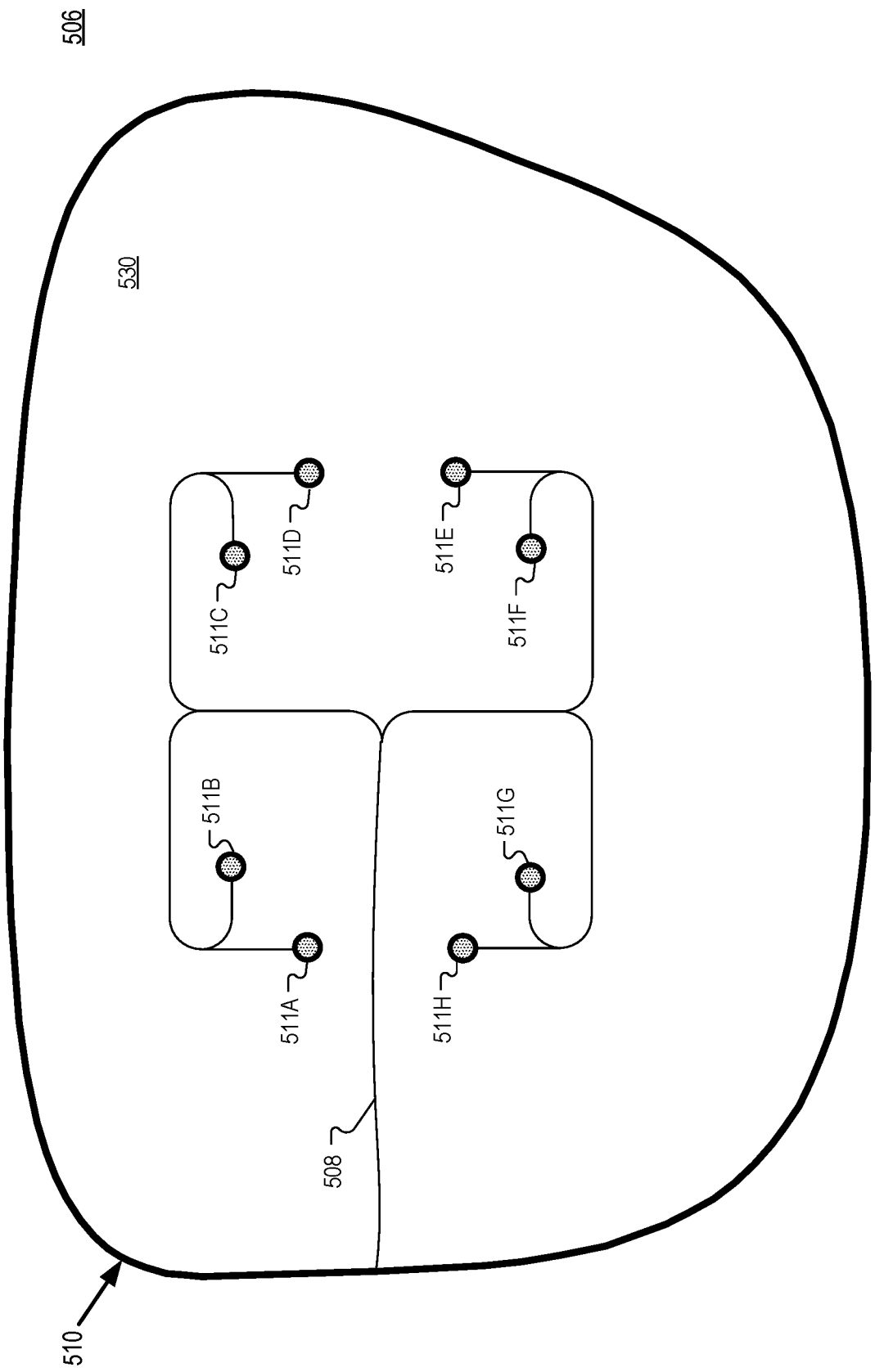
FIG. 5 illustrates an optical element configured to receive non-visible light into a waveguide structure from a single non-visible light source and the waveguide structure distributing the non-visible light to a plurality of outcoupling elements, in accordance with aspects of the present disclosure.

FIG. 5 illustrates an optical element 506 that is configured to receive non-visible light into waveguide structure 508 from a single non-visible light source (not illustrated) and waveguide structure 508 distributes the non-visible light to a plurality of outcoupling elements 511. FIG. 5 illustrates an example optical element 506 including an illumination layer 510 having a plurality of outcoupling elements 511A-511H distributed across transparent layer 530, in accordance with aspects of the disclosure. In the example illustration, the optical path length in waveguide structure 508 is roughly the same for each outcoupling element 511. This may homogenize a brightness output of each outcoupling element 511. In other implementations, the optical path lengths from the non-visible light source to the outcoupling elements 511 of waveguide structure 508 may be adjusted to increase or decrease brightness of a particular outcoupling element 511 due to optical losses in waveguide structure 508 according to the length of waveguide structure 508. Each outcoupling element 511 is configured to outcouple the received non-visible light as non-visible illumination light to illuminate an eye region.

The waveguides described in this disclosure may follow an indirect curving path between a non-visible light source and an outcoupling element. The waveguides may be randomly curved so that, over a variety of viewing angles, any light scattering associated with the waveguides are visually less conspicuous compared to more straight line waveguide paths. Any of the features described in FIGS. 3A-3E may be used in the implementations of optical elements 406 and 506. For example, optical fibers may be utilized for waveguide structures 408 and 508.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted device comprising:
   a frame;
   a near-infrared light source coupled with the frame, wherein the near-infrared light source is configured to emit near-infrared light; and
   an optical element secured to the frame, the optical element including:
      a transparent layer;
      a plurality of outcoupling elements distributed across the transparent layer; and
      a transparent waveguide structure configured to receive the near-infrared light from the near-infrared light source coupled with the frame, wherein the transparent waveguide structure is configured to deliver the near-infrared light from the near-infrared light source to the outcoupling elements, and wherein the outcoupling elements are configured to outcouple the near-infrared light as near-infrared illumination light to illuminate an eye region with patterned near-infrared illumination light, the outcoupling elements including a grating configured to receive the near-infrared light from the transparent waveguide, wherein the outcoupling elements further include a diffractive optical element (DOE), and wherein the grating is configured to receive the near-infrared light and illuminate the DOE.

2. The head mounted device of claim 1, wherein the DOE is configured to control a divergence and a direction of the near-infrared illumination light.

3. The head mounted device of claim 1, wherein the DOE includes a metasurface.

4. An optical system comprising:
   a non-visible light source configured to emit non-visible light;
   a transparent layer;
   outcoupling elements positioned across the transparent layer; and
   a waveguide structure configured to deliver the non-visible light from the non-visible light source to the outcoupling elements, wherein the outcoupling elements are configured to outcouple the non-visible light as non-visible illumination light, and wherein the outcoupling elements include a curved mirror and a refractive microlens configured to provide beam shaping for the non-visible illumination light, wherein the curved mirror directs the non-visible light through the refractive microlens.

5. The optical system of claim 4, wherein a first outcoupling element of the outcoupling elements is configured to outcouple the non-visible illumination light as a first light cone having a first divergence angle, and wherein a second outcoupling element of the outcoupling elements is configured to outcouple the non-visible illumination light as a second light cone having a second divergence angle that is different than the first divergence angle.

6. The optical system of claim 4, wherein the waveguide structure includes a transparent dielectric material to confine the non-visible light to the waveguide structure.

7. The optical system of claim 4, wherein a material used for the waveguide structure is transparent to visible light.

8. The optical system of claim 4, wherein the waveguide structure is coupled between the non-visible light source and at least a portion of the outcoupling elements.

9. The optical system of claim 8, wherein the waveguide structure follows an indirect curving path between the non-visible light source and the outcoupling elements.

10. The optical system of claim 4, wherein the non-visible light source includes at least one of a laser source, a superluminescent light emitting diode (S-LED), a vertical-cavity surface-emitting laser (VCSEL), or an integrated laser array.

11. The optical system of claim 4, wherein the outcoupling elements are less than 75 microns at a widest or longest dimension.

12. The optical system of claim 4, wherein the outcoupling elements are in a field of view (FOV) of an eye of a user of the optical system.

13. The optical system of claim 4 further comprising:
   an input coupling structure configured to receive the non-visible light from the non-visible light source and inject the non-visible light into the waveguide structure.

14. The optical system of claim 4 further comprising:
   an input coupler configured to incouple the non-visible light emitted by the non-visible light source into the waveguide structure.

15. An optical system comprising:
   a non-visible light source configured to emit non-visible light;
   a transparent layer;
   outcoupling elements positioned across the transparent layer; and
   a waveguide structure configured to deliver the non-visible light from the non-visible light source to the outcoupling elements, wherein the outcoupling elements are configured to outcouple the non-visible light as non-visible illumination light, and wherein the outcoupling elements include a curved mirror and a refractive microlens configured to provide beam shaping for the non-visible illumination light, wherein the outcoupling elements further include a microlens, and wherein the grating is configured to receive the near-infrared light and illuminate the microlens.

16. The optical system of claim 15, wherein the outcoupling elements further include a microlens, and wherein the grating is configured to receive the near-infrared light and illuminate the microlens.

17. The optical system of claim 15, wherein the microlens is configured to control a divergence and a direction of the near-infrared illumination light.

18. The optical system of claim 15, wherein the microlens includes a dielectric material.

19. The optical system of claim 15, wherein the outcoupling elements are less than 75 microns at a widest or longest dimension.

* * * * *